US010152092B2

(12) United States Patent
Kinoshita (10) Patent No.: US 10,152,092 B2
(45) Date of Patent: Dec. 11, 2018

(54) ELECTRONIC DEVICE

(71) Applicant: LENOVO (SINGAPORE) PTE. LTD., Singapore (SG)

(72) Inventor: Hiroaki Kinoshita, Kanagawa-ken (JP)

(73) Assignee: LENOVO (SINGAPORE) PTD LTE, Singapore (SG)

( * ) Notice: Subject to any disclaimer, the term of this patent is extended or adjusted under 35 U.S.C. 154(b) by 0 days.

(21) Appl. No.: 15/288,966

(22) Filed: Oct. 7, 2016

(65) Prior Publication Data

US 2017/0102741 A1   Apr. 13, 2017

(30) Foreign Application Priority Data

Oct. 8, 2015   (JP) .................................. 2015-199921

(51) Int. Cl.
*G06F 1/16*   (2006.01)

(52) U.S. Cl.
CPC .......... *G06F 1/1662* (2013.01); *G06F 1/1601* (2013.01); *G06F 1/1618* (2013.01); *G06F 1/1633* (2013.01); *G06F 1/1656* (2013.01); *G06F 1/1681* (2013.01)

(58) Field of Classification Search
CPC ...... G06F 1/618; G06F 1/1601; G06F 1/1633; G06F 1/1662; G06F 1/1681; G06F 1/1656
See application file for complete search history.

(56) References Cited

U.S. PATENT DOCUMENTS

| 6,156,983 A * | 12/2000 | Chen | H01H 13/70 |
| | | | 200/302.1 |
| 2011/0170250 A1* | 7/2011 | Bhutani | G06F 1/1666 |
| | | | 361/679.2 |
| 2013/0206562 A1* | 8/2013 | Su | H01H 13/86 |
| | | | 200/5 A |
| 2014/0311880 A1* | 10/2014 | Krumpelman | H01H 13/14 |
| | | | 200/5 A |
| 2015/0092331 A1* | 4/2015 | Kinoshita | G06F 1/1681 |
| | | | 361/679.09 |

FOREIGN PATENT DOCUMENTS

| JP | 2009169569 A | 7/2009 |
| JP | 2011034332 A | 2/2011 |
| JP | 2015069296 A | 4/2015 |

* cited by examiner

*Primary Examiner* — Leslie J Evanisko
*Assistant Examiner* — Marissa Ferguson Samreth
(74) *Attorney, Agent, or Firm* — Russell Ng PLLC; Antony P. Ng (57) ABSTRACT

An electronic device is disclosed. The electronic device includes a link mechanism provided in a body chassis and configured to operate in linkage with a rotational moving operation for rotationally moving a display chassis relative to a body chassis by a hinge mechanism and a drive wire that is a drive member configured to couple between the link mechanism and a keyboard unit and operate in linkage with the link mechanism, thereby to change relative height positions between a key top and a frame, in which the drive wire is extended to the outside of the keyboard unit through an insertion port formed in a side wall of a base plate and is coupled with the link mechanism and the body chassis includes a drainage passage at a position located under the insertion port.

3 Claims, 12 Drawing Sheets

ELECTRONIC DEVICE

PRIORITY CLAIM

The present application claims benefit of priority under 35 U.S.C. §§ 120, 365 to the previously filed Japanese Patent Application No. JP2015-199921 with a priority date of Oct. 8, 2015, which is incorporated by reference herein.

TECHNICAL FIELD

The present invention relates to electronic devices in general, and in particular to an electronic device configured to couple between a body chassis having a keyboard unit and a display chassis having a display by a hinge mechanism.

BACKGROUND

In recent years, tablet type personal computers (tablet type PCs), each having a touch panel type liquid crystal display and having no physical keyboard, are becoming quite popular. Tablet type PCs are relatively convenient because they are easy to carry and data entry work can be performed by using a touch panel.

However, since a tablet type PC does not have a physical keyboard, certain tasks such as inputting long documents can be quite inconvenient. Accordingly, compatible tablet type personal computer (a compatible type PC) configured such that a display chassis that has a display has been made rotationally movable up to about 360 degrees exceeding about 180 degrees relative to a body chassis having a keyboard is a good alternative. Since a compatible PC is configured to be used in two ways, that is, as a general laptop personal computer (a laptop PC) and a tablet type PC, the compatible type PC is more user friendly.

In one configuration of the compatible type PC, a wire-shaped drive member that has been coupled to the frame of the keyboard unit is rotated by using a link mechanism which operates in linkage with rotation of a hinge mechanism which has coupled between the display chassis and the body chassis thereby to move the frame upward and downward in linkage with a rotational moving operation of the display chassis. In this case, an insertion port through which the drive member is inserted is formed in a side face of the keyboard unit.

Incidentally, the keyboard unit includes a structure which prevents water from leaking into electronic components in the body chassis even when a liquid such as water, beverage, etc. that a user has spilled in error intrudes into the keyboard unit through gaps around each key top and between the key tops. However, since an insert port through which the drive member is to be inserted is provided in a part of such a water-proof structure, it would be important to also prevent liquid from leaking into the body chassis through this part as well.

SUMMARY

In accordance with one embodiment of the present disclosure, an electronic device includes a body chassis and a display chassis. The body chassis is located on an upper surface having a keyboard body surrounded by a frame and a base plate that supports a bottom surface of the keyboard body. The display chassis has a display connected to a hinge mechanism. A link mechanism is provided in the body chassis and is configured to operate in linkage with a rotational moving operation for rotationally moving the display chassis relative to the body chassis by the hinge mechanism. The electronic device also includes a drive member configured to couple between the link mechanism and the keyboard body and operates in linkage with the link mechanism thereby to change relative height positions between a set of key tops and the frame, in which the drive member is extended to the outside of the keyboard body through an insertion port formed in the base plate and is coupled with the link mechanism. The body chassis includes a drainage passage at a position located under the insertion port.

The drainage passage is provided at the position located under the insertion port for the drive member on the base plate of the keyboard unit of the body chassis. Thus, even when a user has spilled liquid on the keyboard unit in error, it is possible to smoothly discharge the liquid that flows onto an upper surface of the base plate that houses and supports the keyboard body through the gaps around each of the key tops and between the key tops and drops into the body chassis through the insertion port therefrom to the outside of the body chassis through the drainage passage. Accordingly, it is possible to prevent the liquid from leaking into the electronic components in the body chassis.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
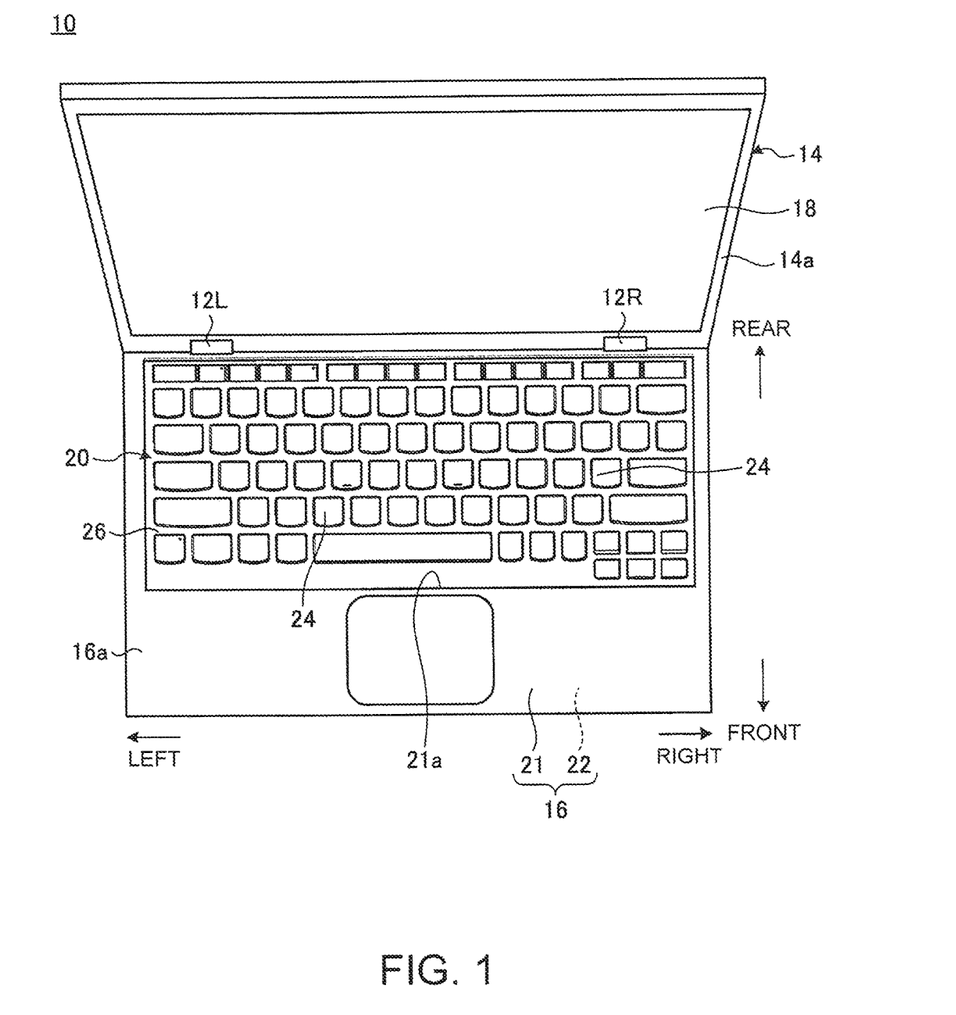
FIG. 1 is a front view of an electronic device according to one embodiment of the present invention.
Figure 2:
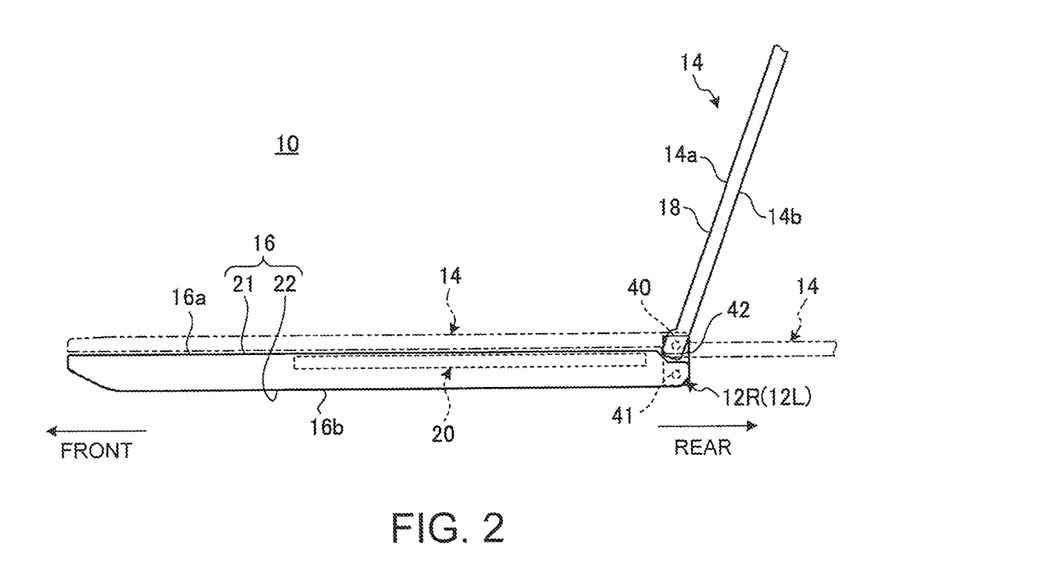
FIG. 2 is a side view of the electronic device from FIG. 1 illustrating a case when the electronic device has been switched to a form to be used as a laptop PC.
Figure 3:
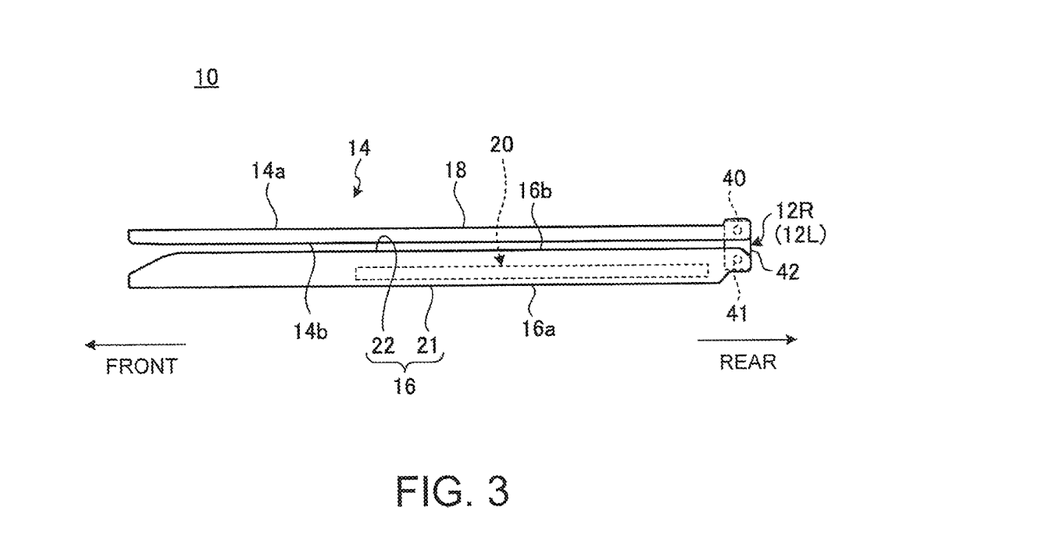
FIG. 3 is a side view of the electronic device from FIG. 1 illustrating a case when the electronic device has been switched to a form to be used as a tablet type PC.

FIG. 1 is a front view of an electronic device 10 according to one embodiment of the present invention, that is a diagram viewing the electronic device 10 which has been switched to a form to be used as a laptop PC by opening a display chassis 14 away from a body chassis 16 via hinge mechanisms 12L and 12R from above. FIG. 2 is a side view of the electronic device 10 illustrating that the electronic device 10 has been switched to the form to be used as the laptop PC. FIG. 3 is a side view of the electronic device 10 illustrating that the electronic device 10 has been switched to a form to be used as a tablet type PC by rotationally moving the display chassis 14 from the state in FIG. 2 to a 360-degree position in an opening direction.

The electronic device 10 according to the present embodiment is a so-called compatible type PC which is favorably used as the laptop PC in a state where the display chassis 14 has been rotationally moved to an angular position of about 90 degrees to about 150 degrees relative to the body chassis 16 (see FIGS. 1 and 2) and is favorably used as the tablet type PC in a state where the display chassis 14 has been rotationally moved to the 360-degree position relative to the body chassis 16 (see FIG. 3). The present invention is also applicable to electronic devices such as, for example, general laptop PCs and various kinds of portable information devices that the display chassis is opened only up to an angle of about 180 degrees, in addition to application to the compatible type PC as mentioned above.

In the following, description will be made by setting the form to be used as the laptop PC illustrated in FIGS. 1 and 2 as a standard and calling the near side as the front (the front part) and the back side as the rear (the rear part), and calling a thickness direction of the body chassis 16 as an up-and-down direction and a width direction of the body chassis 16 as a right-and-left direction in a direction viewed from a user who operates a keyboard unit 20 which has been provided on a front surface (an upper surface) 16a which is an operation surface of the body chassis 16 while visually confirming a display 18 provided on a surface (a front surface) 14a of the display chassis 14.

In addition, in regard to the angular positions of the display chassis 14 relative to the body chassis 16, a posture that the display chassis 14 has been completely closed relative to the body chassis 16 and the surfaces 14a and 16a thereof mutually face will be called a 0-degree position (see the display chassis 14 indicated by a two-dot chain line on the body chassis 16 in FIG. 2) for the convenience of description. Then, description will be made while changing the angle in a direction that the display chassis 14 is rotationally moved in the opening direction by setting the 0-degree position as a standard and, for example, a posture that the display chassis 14 and the body chassis 16 have net at right angles will be called a 90-degree position and a posture that the surfaces 14a and 16a have been arranged in parallel with each other directing in the same direction (upward) will be called a 180-degree position (see the display chassis 14 indicated by the two-point chain line in FIG. 2). Further, a posture that back surfaces of the display chassis 14 and the body chassis 16, that is, a back surface (a rear surface) 14b of the display chassis 14 and a back surface (a lower surface) 16b of the body chassis 16 mutually face will be called the 360-degree position (see FIG. 3). Incidentally, as a matter of course, such a situation naturally occurs that the 0-degree position, the 90-degree position, the 180-degree position, the 360-degree positions and so forth exhibit angular positions which somewhat deviate from accurate angular positions that numerical values of the angles indicate depending on structures of the body chassis 16, the display chassis 14 and/or the hinge mechanisms 12L and 12R and description will be made by calling the positions including these angle-deviated positions as the 0-degree position and so forth in the present embodiment.

As illustrated in FIGS. 1-3, the electronic device 10 includes the display chassis 14 having the display 18 and the body chassis 16 having the keyboard unit 20, and the display chassis 14 and the body chassis 16 are coupled together by one pair of the left and right hinge mechanisms 12L and 12R (in the following, will be also called a "hinge mechanism 12" all in one piece) to be rotationally movable.

The display chassis 14 is electrically connected with the body chassis 16 via a not-illustrated cable which has passed through the hinge mechanism 12. The display 18 is configured by for example, a touch panel type liquid crystal display unit.

The body chassis 16 is formed into a flat box-shape by an upper surface cover 21 which forms the front surface 16a and a bottom surface cover 22 which forms the back surface 16b, and then the hinge mechanism 12 is provided on a rear-end edge part thereof. Various electronic components such as an electronic substrate 38 (see FIG. 5 and FIG. 6), an arithmetic operation unit, a memory and so forth are housed in the body chassis 16.

The keyboard unit 20 which has been provided on the front surface 16a of the body chassis 16 is an isolation type keyboard unit which includes a plurality of key tops 24 which have been arrayed so as to line up in the fore-and-aft direction and the left-and-right direction, a frame (a cosmetic frame) 26 which fills the gap around each key top 24 and so forth. Accordingly, in the keyboard unit 20, the adjacent key tops 24 are mutually partitioned by the frame 26 thereby to be configured independently of each other.

The frame 26 is a frame body that a plurality of key installation holes 26a (see FIG. 4 and FIG. 12) through which the respective key tops 24 are inserted has been formed in one plate-shaped member. The frame 26 is movable upward and downward in an opening 21a which has been provided in the front surface 16a of the body chassis 16, that is, the opening 21a for installation of the keyboard unit 20 which has been formed in the upper surface cover 21 of the body chassis 16. An upward/downward operation of the frame 26 is performed in linkage with a rotational moving operation of the display chassis 14 by the hinge mechanism 12.

Figure 4:
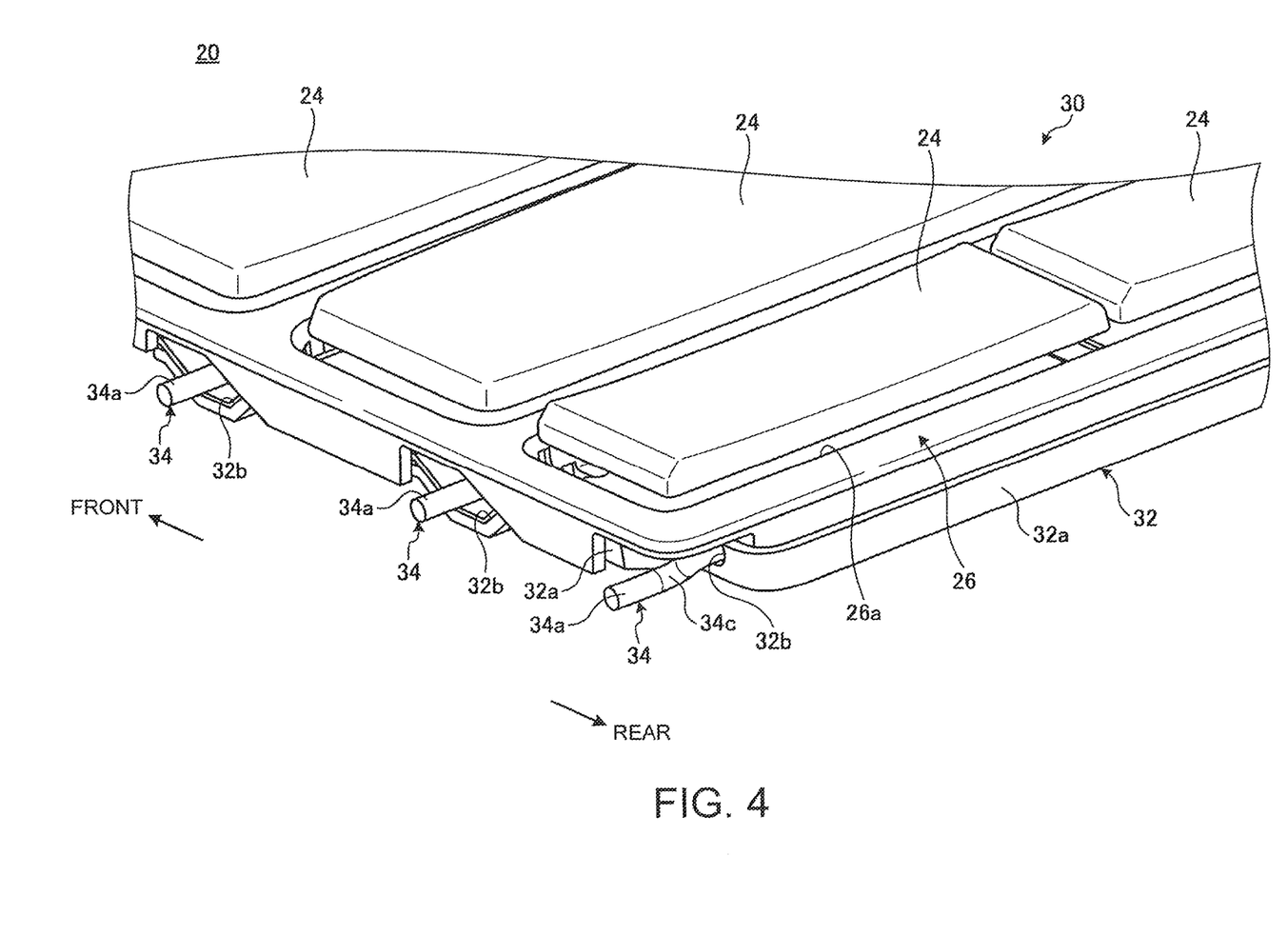
FIG. 4 is an enlarged perspective view of a keyboard unit of the electronic unit from in FIG. 1.
Figure 5:
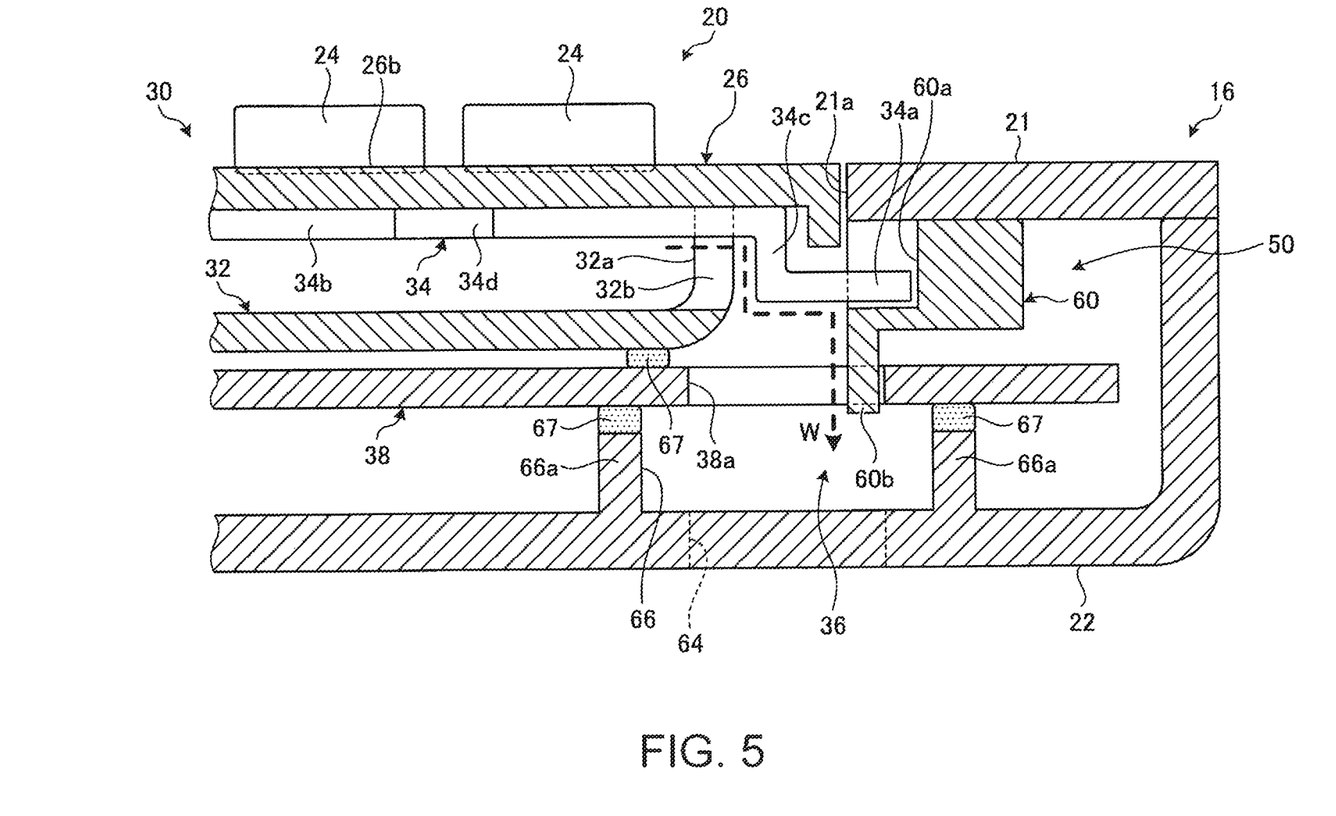
FIG. 5 is a longitudinal cross-sectional diagram of an inner structure of a body chassis including the keyboard unit.
Figure 6:
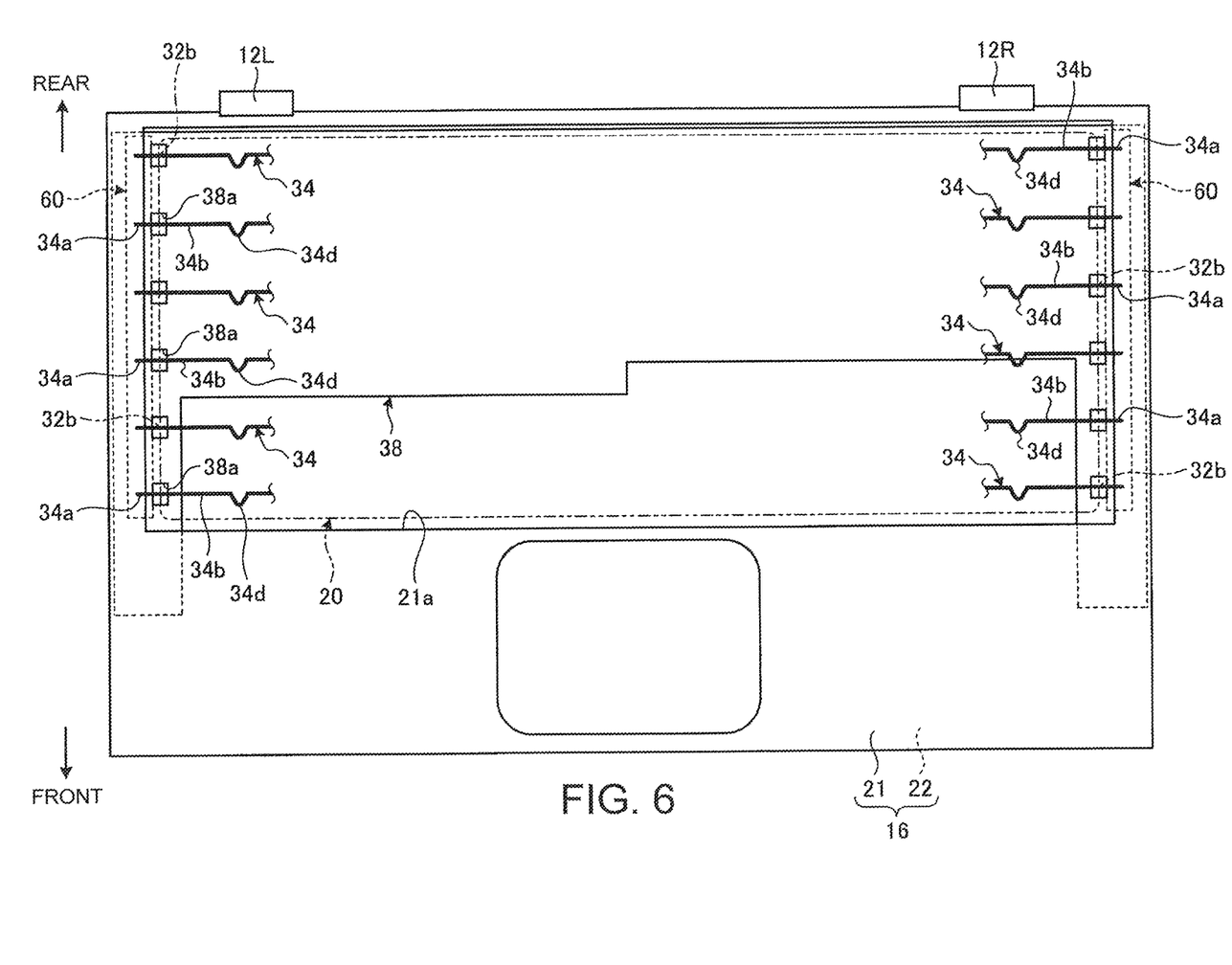
FIG. 6 is a top view of the electronic device with the keyboard unit being detached from the body chassis.
Figure 7:
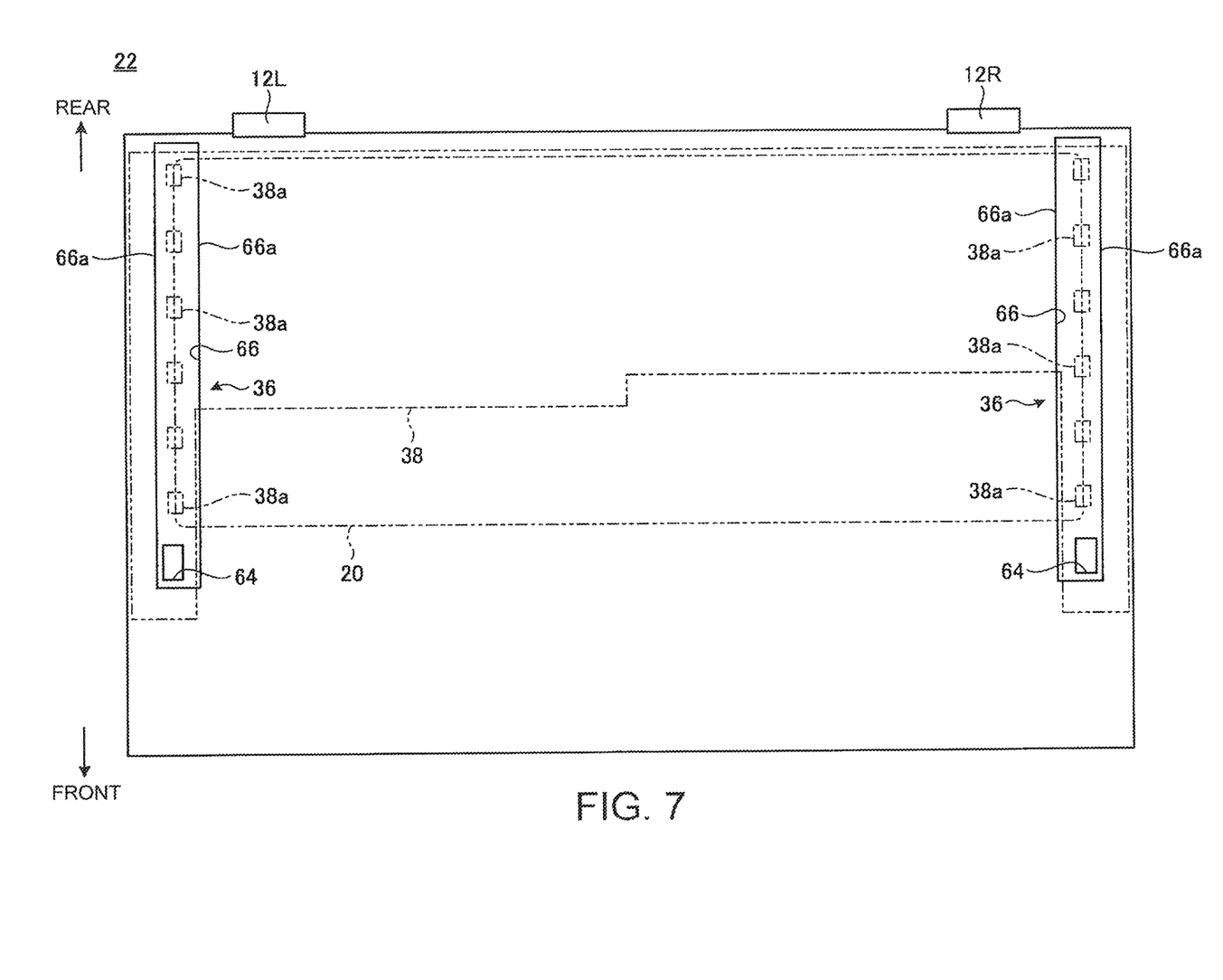
FIG. 7 is a top view of an inner structure of a bottom surface cover of the body chassis.

FIG. 4 is an enlarged perspective view of the keyboard unit 20. FIG. 5 is a longitudinal cross-sectional diagram of an inner structure of the body chassis 16 including the keyboard unit 20. In addition, FIG. 6 is a top view of the electronic device 10 in a state where the keyboard unit 20 has been detached from the body chassis 16. FIG. 7 is a top view of an inner structure of the bottom surface cover 22 of the body chassis 16.

As illustrated in FIGS. 4 and 5, the keyboard unit 20 includes a keyboard body 30 having the key tops 24 and the frame 26, a bath-tub-shaped base plate 32 which houses and supports the bottom surface of the keyboard body 30 and so forth.

The keyboard body 30 includes the key tops 24 which are installed on the upper surface side of the base plate 32 to be movable upward and downward via a not illustrated guide mechanism, the frame 26 which fills the gap around each key top 24 and is installed on the upper surface side of the base plate 32 to be movable upward and downward under a driving action of a drive wire 34 which is a drive member and so forth.

The key top 24 is a general key switch which transmits a signal according to the kind of that key by closing a contact such as a membrane switch and so forth which has been installed on the upper surface of the base plate 32 when depressed. The frame 26 is a frame-shaped resinous plate member which has been arranged around each key top 24 and is supported to be movable upward and downward at a position located on the upper surface of the base plate 32 and in the opening 21a of the upper surface cover 21. A lower surface (an inner surface) of the frame 26 is pressed by the drive wire 34 so as to move the frame 26 upward and downward and thereby it becomes possible for the frame 26 to move from a lowered position (see FIG. 12) where the upper surface thereof is located lower than a top surface of each key top 24 to an elevated position (see FIG. 13) where the upper surface thereof is flush with or located slightly higher than the top surface of each key top 24.

The base plate 32 is formed by a metal plate such as a thin aluminum plate and so forth. The base plate 32 serves as an attachment plate of the keyboard body 30 and all of the key tops 24 which are installed on the keyboard unit 20 concerned share one base plate 32. As illustrated in FIGS. 4 and 5, four peripheral edges of the base plate 32 are surrounded by a side wall 32a which stands upright and thereby the base plate 32 has a bath-tub shape which allows the base plate 32 to house the bottom surface of the keyboard body 30 and allows the base plate 32 to store the liquid therein. Accordingly, although when the user has spilled the liquid such as water, the beverage and so forth on the keyboard unit 20 in error, the liquid intrudes into the keyboard unit 20 passing through the gap between each key top 24 and the frame 26, the base plate 32 which has the bath-tub shape serves as a receptacle and prevents the liquid from leaking into the body chassis 16.

However, although details will be described later, in the electronic device 10 concerned, the drive wire 34 is extended to the outside of the keyboard unit 20 in order to configure the frame 26 to be movable upward and downward by the drive wire 34 as mentioned above. Accordingly, insertion ports 32b (see FIGS. 4 and 5) through which the drive wires 34 are inserted are formed in line in the fore-and-aft direction in the side wall 32a of the base plate 32. Consequently, since it is feared that the liquid which has been stored in the bath-tub-shaped part of the base plate 32 may intrude into the body chassis 16 through the insertion port 32b, the electronic device 10 concerned is configured such that a drainage passage 36 adapted to smoothly discharge the liquid which has passed through the insertion port 32b to the outside of the body chassis 16 is provided so as to prevent the liquid from leaking into the respective electronic components in the body chassis 16.

As illustrated in FIGS. 5 and 6, the keyboard unit 20 is arranged on the upper surface side of the electronic substrate 38 which has been provided in the body chassis 16 by being installed in the opening 21a which has been formed in the upper surface cover 21 of the body chassis 16. The electronic substrate 38 is a control substrate which extends across the left-and-right direction of the body chassis 16 and serves as a master of the electronic device 10 concerned. A plurality (six hole parts in the present embodiment) of hole parts 38a which has been respectively arrayed in the fore-and-aft direction is formed in left and right end parts of the electronic substrate 38.

Next, one configurational example of a movable structure of the frame 26 will be described and then one example of a configuration of the drainage passage 36 will be described.

As described above, in the configuration of the present embodiment, the movable structure (the upward/downward operation) of the frame 26 works in linkage with the rotational moving operation of the display chassis 14 by the hinge mechanism 12. Accordingly, first, the configurational example of the hinge mechanism 12 will be described.

Figure 8:
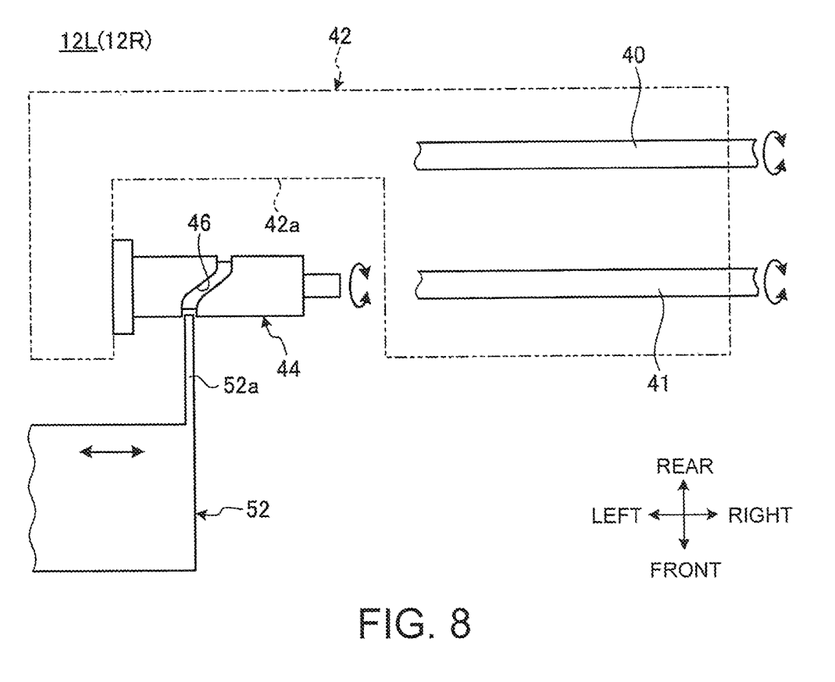
FIG. 8 is a top view of a hinge mechanism used in the electronic device according to the present embodiment.

FIG. 8 is a top view of the hinge mechanism 12 used in the electronic device 10 according to the present embodiment and representatively illustrates a configuration of the left-side hinge mechanism 12L. In the following, although description will be made by illustrating the left-side hinge mechanism 12L as the hinge mechanism 12, the right-side hinge mechanism 12R has a structure which is bilaterally symmetric with that of the left-side hinge mechanism 12L and is substantially the same as that of the left-side hinge mechanism 12L and therefore description thereof is omitted.

As illustrated in FIG. 8, the hinge mechanism 12L (12R) includes a first shaft (a first shaft) 40 which extends in the left-and-right direction, a second shaft (a second shaft) 41 which has been arranged in parallel with the first shaft 40, a tubular hinge chassis 42 which pivots and houses the first shaft 40 and the second shaft 41 to be rotatable (also see FIGS. 2 and 3) and so forth.

The first shaft 40 rotates integrally with the display chassis 14 by being fitted into and fixed to a not illustrated fitting hole which has been provided in the display chassis 14 at one end thereof. The second shaft 41 rotates integrally with the body chassis 16 by being fitted into and fixed to a not illustrated fitting hole which has been provided in the body chassis 16 at one end thereof. Most parts of the first shaft 40 and the second shaft 41 are housed in the hinge chassis 42 in a state of being rotatable. The first shaft 40 and the second shaft 41 are configured such that, for example, only the first shaft 40 rotates when moving from the 0-degree position to the 180-degree position and only the second shaft 41 rotates when moving from the 180-degree position to the 360-degree position. It goes without saying that the configuration may be made such that the rotation of the first shaft 40 or the second shaft 41 is selected at other rotation angle positions and/or the configuration may be made such that, for example, the first shaft 40 and the second shaft 41 rotate in synchronization with each other by a not illustrated a gear train and so forth.

Figure 9:
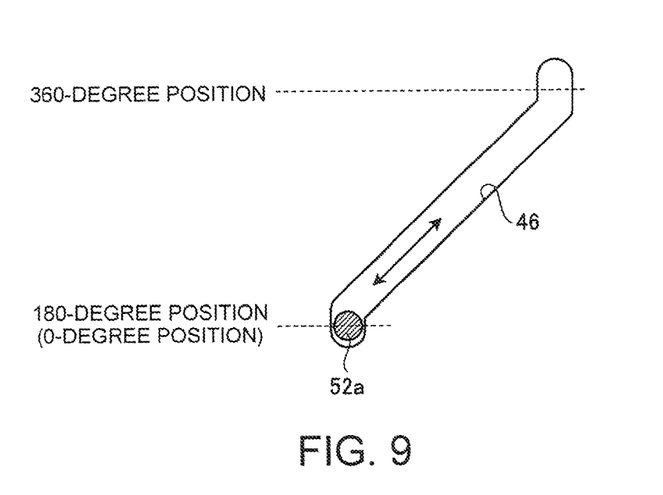
FIG. 9 is a diagram illustrating a rail groove formed in an outer circumferential surface of a spiral pin to be provided on the hinge mechanism.

A recessed part 42a into which a protruded part which has been provided on a rear end edge part of the body chassis 16 fits is provided in the hinge chassis 42 and a spiral pin 44 is installed in a projected state on one side surface of the recessed part 42a. The spiral pin 44 is provided coaxially with the second shaft 41 on the body chassis 16 side and rotates coaxially with the second shaft 41 in linkage with the rotational moving operation of the hinge chassis 42. A rail groove 46 which is formed into a shape illustrated in the development diagram illustrated in FIG. 9 is spirally formed in an outer circumferential surface of the spiral pin 44.

The rail groove 46 is a groove which is formed so as to draw a spiral along the axial direction in the outer circumferential surface of the spiral pin 44 and directs from the left to the right of the spiral pin 44 in case of the hinge mechanism 12L. An engagement piece 52a of a hinge link 52 which configures a link mechanism 50 described later engages with the rail groove 46 to be slidable.

Since the second shaft 41 rotates while the display chassis 14 is rotationally moving from the 180-degree position to the 360-degree position, the spiral pin 44 rotates in accordance with this rotation and thereby the engagement piece 52a moves along the rail groove 46. On the other hand, since the second shaft 41 does not rotate while the display chassis 14 is rotationally moving from the 0-degree position to the 180-degree position, also the spiral pin 44 does not rotate and therefore the engagement piece 52a stays on one end part which serves as a starting point of the rail groove 46. Incidentally, for example, when the first shaft 40 and the second shaft 41 have been configured so as to rotate in synchronization with each other, the rail groove 46 may be configured such that a groove (an idle motion groove) which runs along a circumferential direction of the spiral pin 44 is provided in one end part which serves as the starting point of the rail groove 46 such that the engagement piece 52a moves along the groove which runs along the circumferential direction while moving from the 0-degree position to the 180-degree position.

Next, a configurational example of the link mechanism 50 which links the rotational moving operation of the display chassis 14 by the hinge mechanism 12 with the upward/downward operation of the frame 26 of the keyboard unit 20 will be described.

Figure 10:
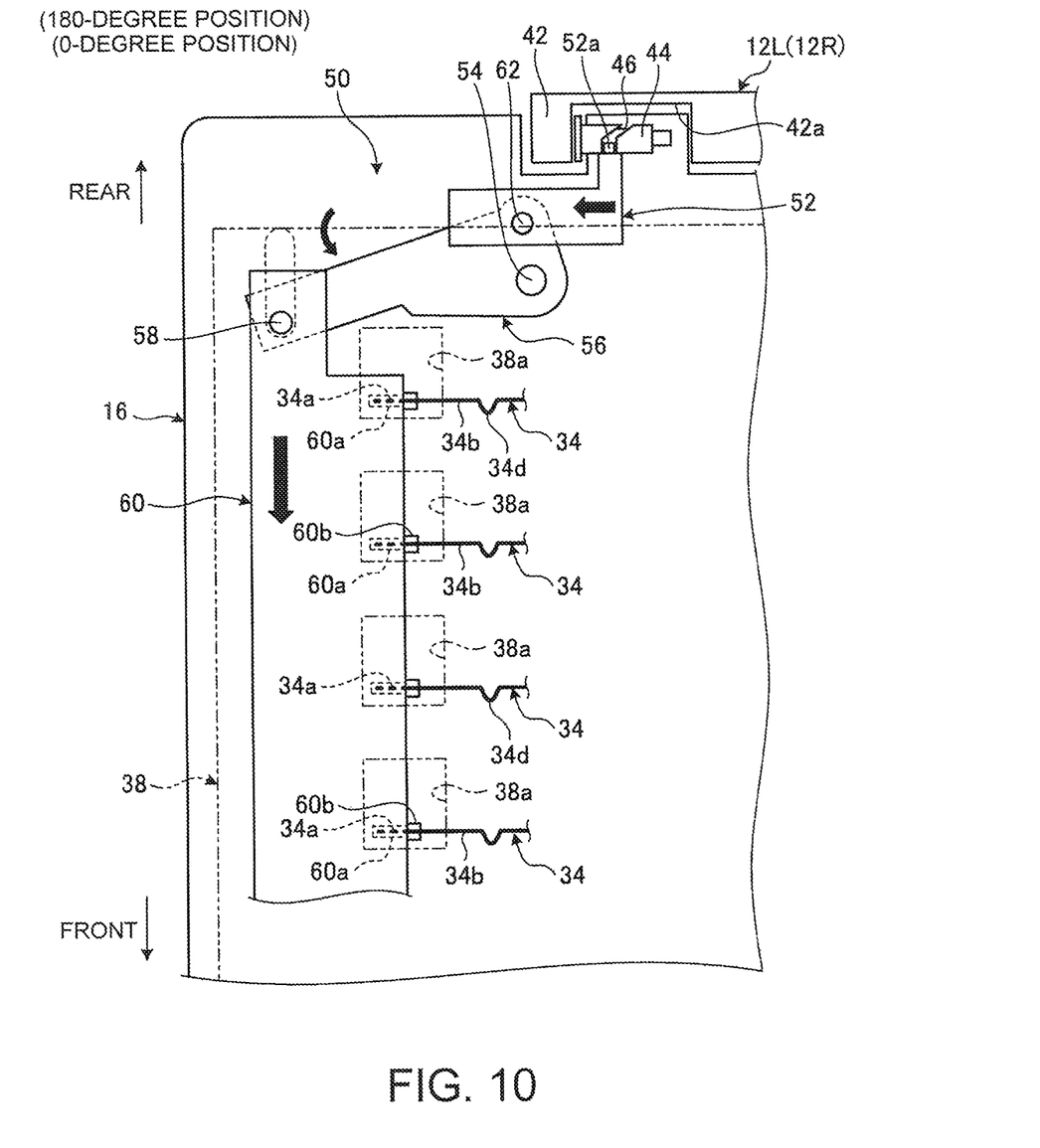
FIG. 10 is a top view illustrating a state of a link mechanism at a 180 degree position.
Figure 11:
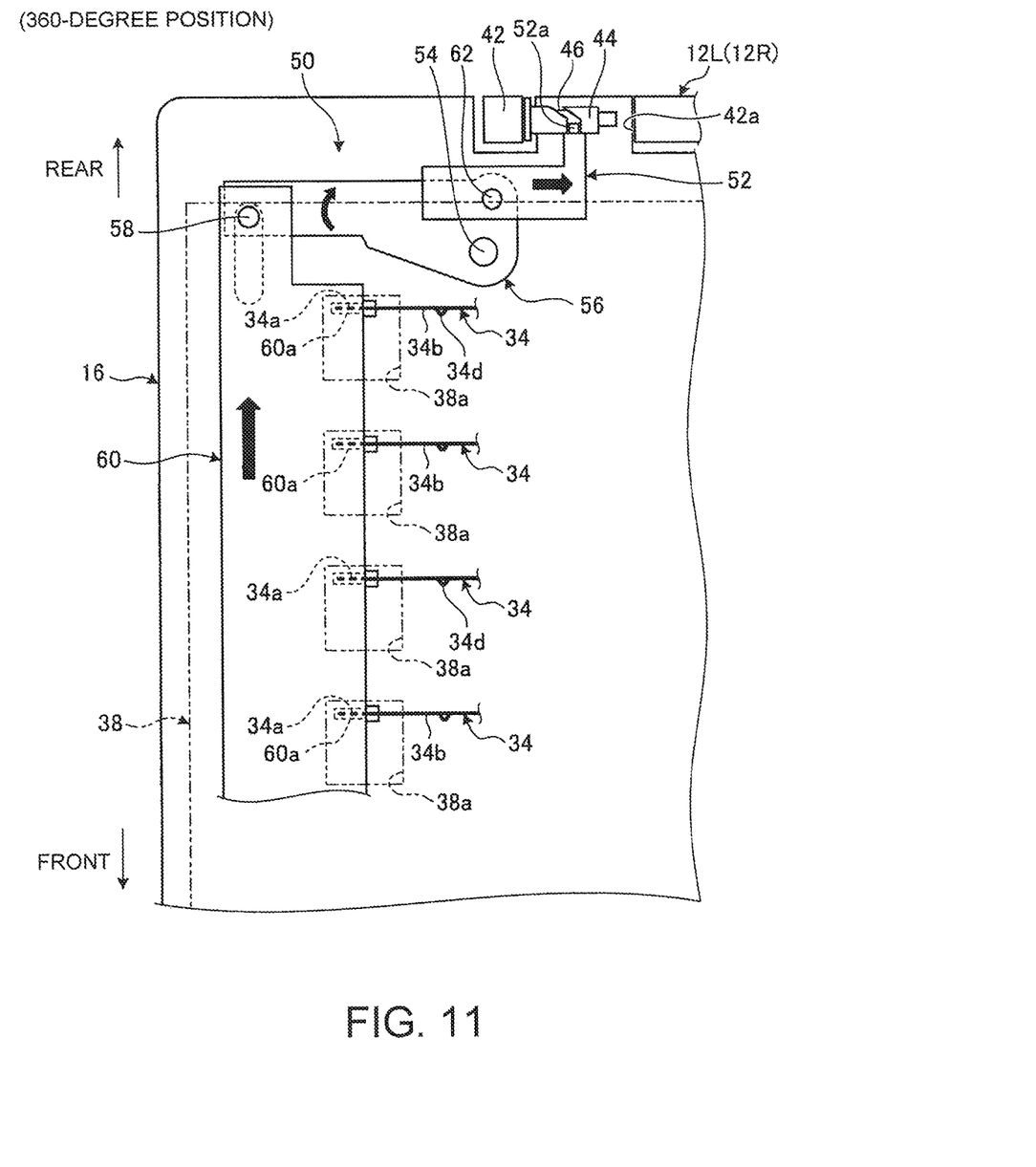
FIG. 11 is a top view illustrating a state of the link mechanism at a 360 degree position.

FIG. 10 is a plan view schematically illustrating one example of a state of the link mechanism 50 at the 180-degree position (while moving from the 180-degree position to the 0-degree position), and FIG. 11 is a plan view schematically illustrating one example of the state of the link mechanism 50 at the 360-degree position. Although, description will be made by illustrating the left-side hinge mechanism 12L and the link mechanism 50 which operates in linkage with the hinge mechanism 12L in FIG. 10 and FIG. 11, the right-side hinge mechanism 12R and the link mechanism 50 which operates in linkage with the right-side hinge mechanism 12R have the structures which are bilaterally symmetric with those of the left-side hinge mechanism 12L and the link mechanism 50 and have substantially the same structures as the above and therefore description thereof is omitted.

As illustrated in FIGS. 10 and 11, the link mechanism 50 is configured to operate in the body chassis 16 and includes a hinge link 52 which has been supported to be movable in the left-and-right direction in an inner surface of the body chassis 16, a swing member 56 which has been supported to the inner surface of the body chassis 16 so as to be rotationally movable around a one-end-side rotary shaft 54, a slide member 60 which has been coupled to the other end side which is opposite to the rotary shaft 54 of the swing member 56 so as to be rotatable via an action pin 58 and so forth. The hinge link 52, the swing member 56, the slide member 60 and so forth which configure the link mechanism 50 are supported to a lower surface (an inner surface) of the upper surface cover 21 of the body chassis 16 so as to be movable and are arranged on the upper surface side of the electronic substrate 38 (also see FIGS. 5 and 6).

The hinge link 52 is an L-shaped plate which includes the engagement piece 52a which projects backward and engages with the rail groove 46 in the spiral pin 44. When the display chassis 14 is rotationally moved and the spiral pin 44 rotates, the hinge link 52 slidably moves in the left-and-right direction with the aid of sliding of the engagement piece 52a along the rail groove 46 (see FIGS. 10 and 11).

The swing member 56 is an almost triangular plate having a curved shape which expands toward the one-end side located on the hinge link 52 side where the rotary shaft 54 has been provided. The swing member 56 is coupled with the hinge link 52 by a coupling pin 62 in a state of being mutually rotatable at a position located on the rear of the rotary shaft 54. The other end side of the swing member 56 which is opposite to the rotary shaft 54 is coupled with the slide member 60 by the action pin 58 to be rotatable.

The slide member 60 is a long rectangular plate which has been provided on the body chassis 16 to be slidable in the fore-and-aft direction by a not illustrated guide structure. The action pin 58 is installed in a projected state on a rear end part of the slide member 60 and the action pin 58 is coupled to the swing member 56 to be rotatable.

In the link mechanism 50 so configured, when the hinge link 52 slidably moves in the left-and-right direction by receiving rotation of the spiral pin 44, the swing member 56 rotationally moves with the coupling pin 62 serving as a point of effect and with the rotary shaft 54 serving as a rotational movement fulcrum, and the slide member 60 moves in the fore-and-aft direction with the action pin 58 serving as a point of action (see FIGS. 10 and 11).

Next, a configurational example of the drive wire 34 which moves the frame 26 upward and downward by receiving driving force from the link mechanism will be described.

Figure 12:
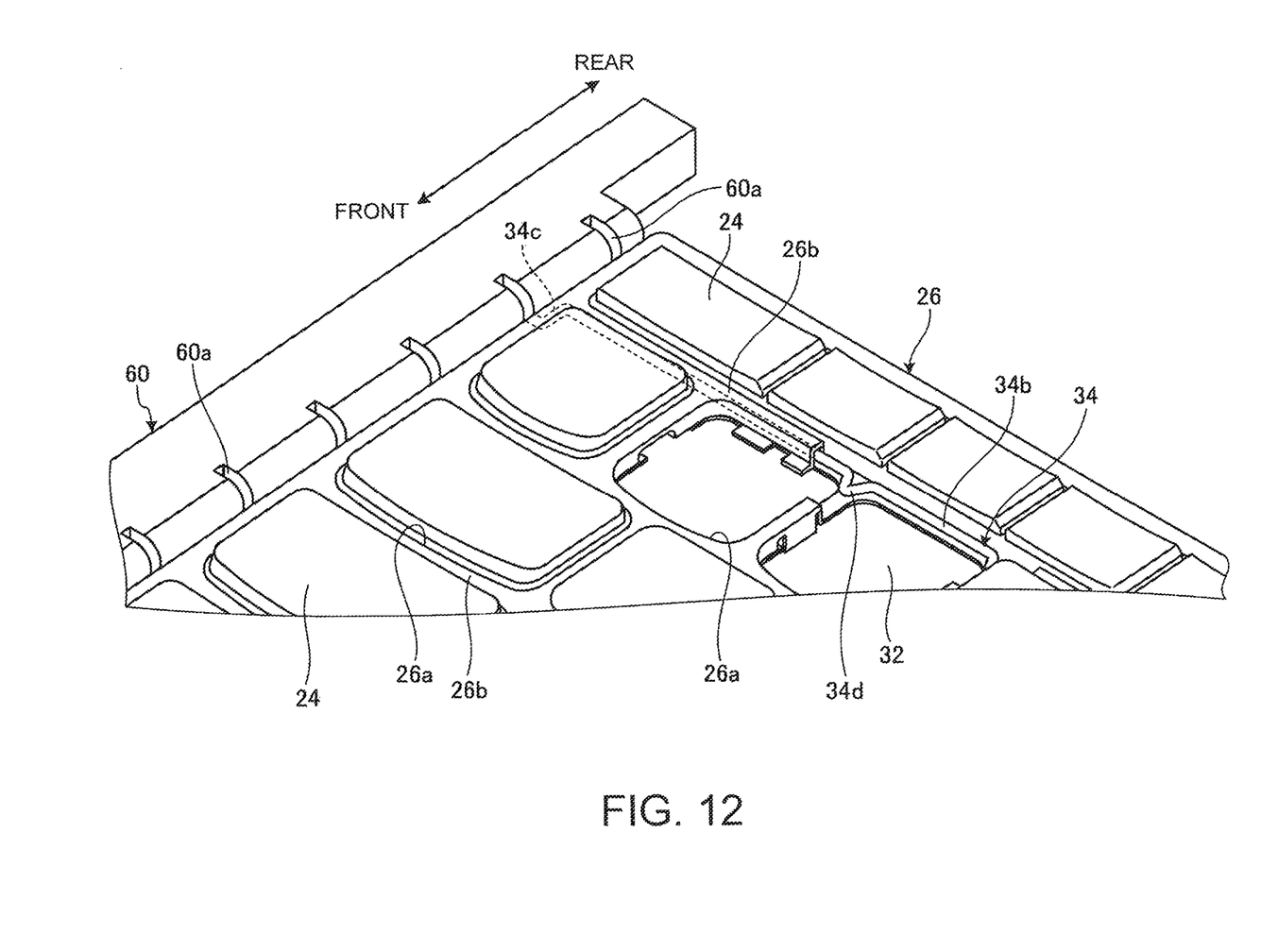
FIG. 12 is an enlarged perspective view illustrating one example of the keyboard unit when a frame is at a lowered position.

As illustrated in FIGS. 6, 10 and 12, the drive wire 34 is laid between slits 60a and 60a in the left and right slide members 60 which operate in linkage with the left and right hinge mechanism 12L and 12R. The drive wire 34 is a hard wire rod made of a SUS material and so forth and has sufficient rigidity with a diameter of, for example, about 1 mm. In the present embodiment, six drive wires 34 are arrayed in a line in the fore-and-aft direction.

Each drive wire 34 includes drive end parts 34a and 34a which have been provided respectively on the both ends and a base part 34b which is a linear portion extending in the left-and-right direction between the drive end parts 34a and 34a on the both ends. As illustrated in FIGS. 4 and 5, the drive end part 34a is formed by being bent at an angle of about 90 degrees from the leading end of an arm part 34e formed by bending an end part of the base part 34b at an angle of about 90 degrees and is projected in the left-and-right direction so as to be parallel with the base part 34b. Thereby, the both ends of the drive wire 34 are formed into a crank-shape. The notched insertion ports 32b are formed in the left and right side walls 32a of the base plate 32 of the keyboard unit 20 at positions corresponding to the respective drive wires 34 and the arm part 34c and the drive end part 34a are provided on the end part of the base part 34b which has passed through the insertion port 32b. The both ends of the drive wire 34 are configured to have bilaterally symmetric structures.

The drive end parts 34a and 34a on the both ends are engaged with the slits 60a and 60a in the left and right slide members 60 and 60 respectively to be movable in the up-and-down direction and to be rotatable. The base part 34b is coupled to a lower surface of a horizontal frame 26b of the frame 26 which extends in the left-and-right direction so as to fill the gaps which has been formed between the respective key tops 24 in the fore-and-aft direction in a state of being rotatable (see FIG. 12 and FIG. 13). A bent part 34d which has been bent forward into a V-shape is formed on the base part 34*b*. Many of the bent parts 34*d* is formed along the left-and-right direction of the base part 34*b*.

Next, the upward/downward operation of the frame 26 which is performed in linkage with the rotational moving operation of the display chassis 14 by the link mechanism 50 will be described.

First, since the second shaft 41 does not rotate while the display chassis 14 is being moved from the 0-degree position to the 180-degree position, also the spiral pin 44 does not rotate, the swing member 56 is located at a position obtained by being moved rotationally in the most counter-clockwise direction in the drawing by the hinge link 52 which is located at an initial position as illustrated in FIG. 10 and the action pin 58 is located at the front-most position. Accordingly, also the slide member 60 is located at a position obtained by moving to the front-most side.

In this state, in the drive wire 34, the bent part 34*d* is in a sideways falling posture on the base plate 32 as illustrated in FIG. 10 and FIG. 12. Accordingly, also the frame 26 to which the base part 34*b* of the drive wire 34 has been coupled to be rotatable is drawn by the base part 34*b* and is located at the lowered position, the upper surface of the frame 26 is located lower than the top surface of each key top 24 as illustrated in FIG. 12, and therefore it is possible to favorably operate the key tops 24.

Next, when the display chassis 14 is rotationally moved in the opening direction beyond the 180-degree position, also the hinge chassis 42 of the hinge mechanism 12 rotationally moves and the spiral pin 44 rotates, and therefore the engagement piece 52*a* of the hinge link 52 slides along the rail groove 46 while moving from the 180-degree position to the 360-degree position (see FIG. 10). Consequently, the hinge link 52 is pushed and moved in an advancing direction (the right in FIG. 11), and rotationally moves the swing member 56 in a clockwise direction and advances the slide member 60 backward via the action pin 58 as illustrated in FIG. 11 by rotation of the spiral pin 44 from the 180-degree position to the 360-degree position.

When the slide member 60 moves backward, also the drive end part 34*a* of the drive wire 34 moves backward. Therefore, the base part 34*b* of the drive wire 34 rotates and the bent part 34*d* stands upright, and the bent part 34*d* takes a stand-upright vertical posture on the base plate 32 at the 360-degree position illustrated in FIG. 11 and FIG. 13.

Figure 13:
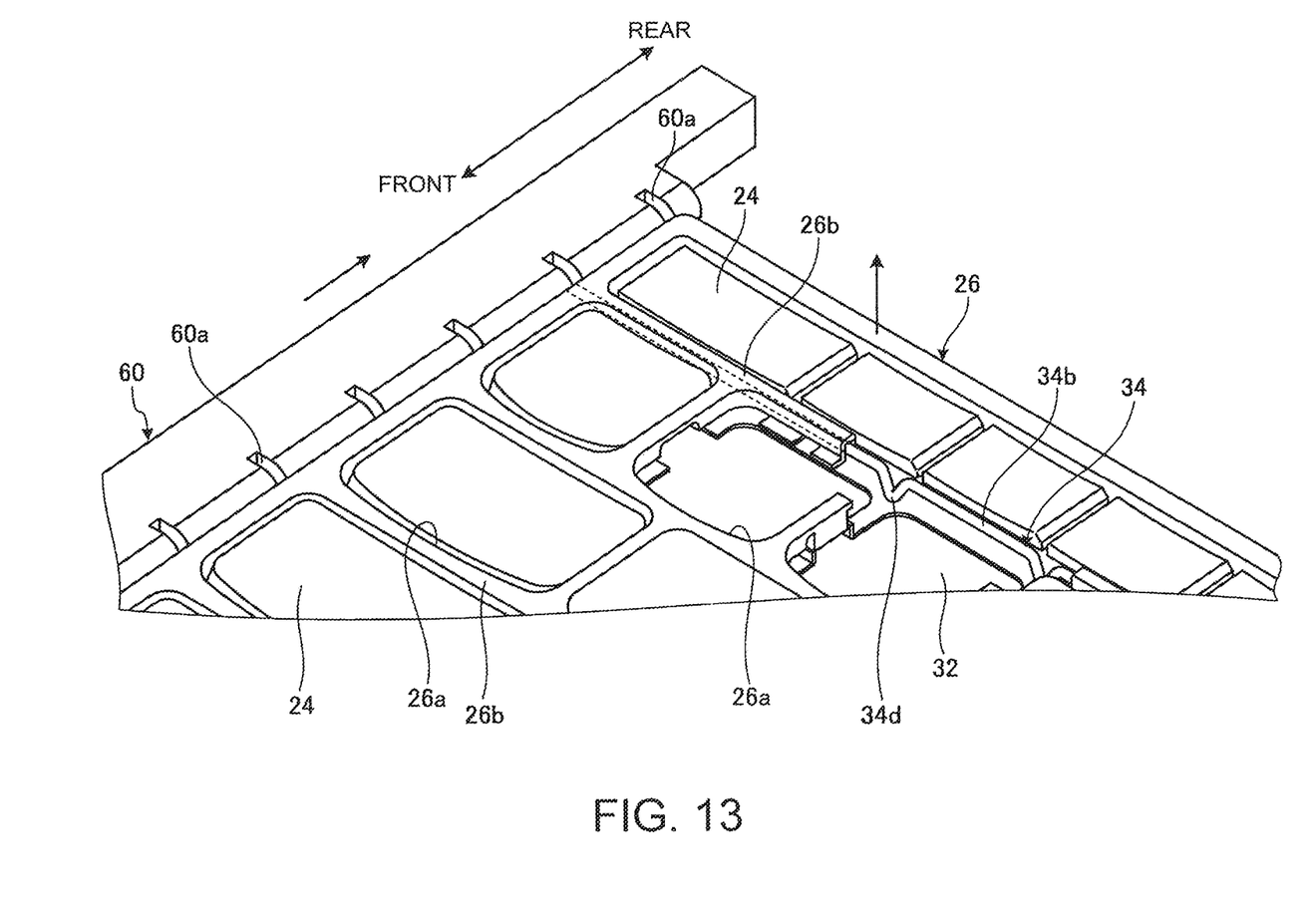
FIG. 13 is an enlarged perspective view illustrating one example of the keyboard unit when the frame has been moved from the position illustrated in FIG. 12 up to an elevated position.

In this state, the base part 34*b* of the drive wire 34 is located at the elevated position obtained by elevating it from above the base plate 32 and also the frame 26 which is coupled with this base part 34*b* is lifted up by the base part 34*b* and is located at the elevated position. Accordingly, the upper surface of the frame 26 is flush with or is located slightly higher than the top surface of the key top 24 and the upper surface of the keyboard unit 20 is almost flattened as illustrated in FIG. 13. That is, since each of the key tops 24 is substantially hidden under the frame 26 and the front surface 16*a* of the body chassis 16 is flattened, the keyboard unit 20 does not hinder the operation when the electronic device 10 is used as the tablet type PC. Incidentally, when the display chassis 14 which is located at the 360-degree position is to be rotationally moved in the closing direction, an operation which acts in a direction opposite to that of the rotational moving operation in the above-mentioned opening direction occurs.

Incidentally, as described above, although in the electronic device 10 concerned, the bath-tub-shaped base plate is adopted as the base plate 32 of the keyboard unit 20, it is feared that the liquid may leak into the electronic device 10 through the insertion port 32*b* through which the drive wire 34 is inserted.

Accordingly, then, the drainage passage 36 adapted to smoothly discharge the liquid which has passed through the insertion port 32*b* to the outside of the body chassis 16 will be specifically described.

As illustrated in FIGS. 5 and 7, the drainage passage 36 is installed under the insertion ports 32*b* in the side wall 32*a* of the base plate 32 and includes a drainage port 64 which has been formed so as to pass through the bottom surface of the bottom surface cover 22 of the body chassis 16 and a tub-shaped part 66 which connects between the drainage port 64 and the position located under the respective insertion ports 32*b* so as to allow flowing of the liquid.

The tub-shaped part 66 is configured by one pair of left and right wall parts 66*a* and 66*a* which have been formed on an inner surface of the bottom surface cover 22. Since, in the present embodiment, the plurality of drive wires 34 is provided in line in the fore-and-aft direction of the keyboard unit 20, also the plurality of insertion ports 32*b* is provided in line in the fore-and-aft direction of the left and right side walls 32*a* (see FIGS. 4 and 6). Then, the tub-shaped part 66 is formed into a long shape which extends in the fore-and-aft direction so as to reach all of the insertion ports 32*b* such that it becomes possible to receive the liquid which drops through all of the insertion ports 32*b* which have been arrayed in line in the fore-and-aft direction. As illustrated in FIG. 5, a water-proof seal 67 which has been made by sponge and so forth is installed between an upper end surface of each wall part 66*a* and the electronic substrate 38.

Incidentally, the configuration may be made such that each insertion port 32*b* is formed in the bottom surface of the base plate 32 and the drive wire 34 which has passed through the insertion port 32*b* concerned, for example, by bending it into the crank shape is extended to the lateral side of the keyboard unit 20. In this case, the hole parts 38*a* and the drainage passage 36 may be arranged under the insertion ports 32*b* which have been formed in the bottom surface of the base plate 32.

The drainage port 64 is a hole part adapted to discharge the liquid which has flown downward through each insertion port 32*b* and flown through the tub-shaped part 66 to the outside of the body chassis 16. In the present embodiment, setting is made such that the rear of the body chassis 16 is located higher than the front so as to take a front down inclined installation posture in the form to be used as the laptop PC. Thus, the drainage port 64 is formed in a front end part of the tub-shaped part 66 in order to smoothly discharge the liquid which has flown through the tub-shaped part 66 from the rear to the front (see FIG. 7).

Therefore, even when the liquid such as water, the beverage and so forth which has been spilled on the upper surface of the keyboard unit 20 has dropped through each insertion port 32*b* via the upper surface of the base plate 32 passing through the gaps around each key top 24 and between the key tops 24, the liquid is smoothly discharged to the outside of the body chassis 16 through the drainage port 64 via the tub-shaped part 66.

In the electronic device 10 concerned, the electronic substrate 38 is interposed between the insertion ports 32*b* (the base plate 32) and the bottom surface cover 22. Then, as described above, each hole part 38*a* is formed in the electronic substrate 38 at the position located under each insertion port 32*b* so as to communicate the drainage passage 36 with each insertion port 32*b* (see FIG. 5 and FIG. 6). Thereby, the liquid which has flown downward through each insertion port 32b drops to the tub-shaped part 66 through each hole part 38a without flowing on the upper surface of the electronic substrate 38. The water-proof seal 67 is also installed between the electronic substrate 38, that is, an edge part of each hole part 38a in the electronic substrate 38 and the base plate 32 in order to surely prevent the liquid from flowing onto the supper surface of the electronic substrate 38.

A rib-shaped projection 60b which has projected downward from a side edge part of the slide member 60 is inserted into each hole part 38a in the electronic substrate 38. The projection 60b is provided under the slit 60a with which the drive end part 34a of the drive wire 34 is engaged and is made movable in the hole part 38a in association with movement of the slide member 60 in the fore-and-aft direction. It becomes possible to drop the liquid which has flown into the slit 60a through each insertion port 32b along the drive wire 34 to the part under each hole part 38a along the projection 60b and to smoothly discharge the liquid to the tub-shaped part 66 owing to provision of the projection 60b (see a broken line W in FIG. 5).

Figure 14A:
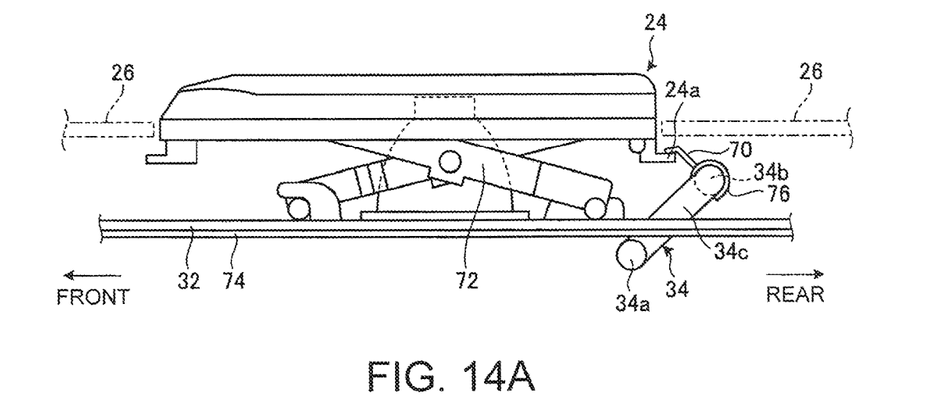
FIG. 14A is a diagram illustrating one example of a configuration which moves upward and downward a key top, that is, a side view illustrating one example that the key top is at a highest use position.
Figure 14B:
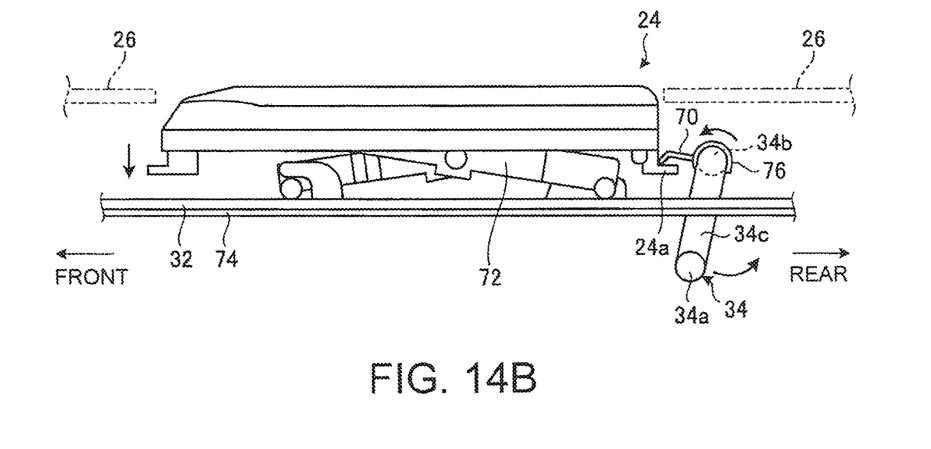
FIG. 14B is a diagram illustrating the configuration which moves upward and downward the key top, that is, a side view illustrating one example that the key top has been depressed from the state illustrated in FIG. 14A to a non-use position.

Such a drainage structure that the liquid is discharged from the keyboard unit 20 using the drainage passage 36 is also applicable to a configuration that, for example, as illustrated in FIG. 14, the frame 26 is configured as a fixed structure and the relative height positions between the key tops 24 and the frame 26 are changed by moving upward and downward the key tops 24, other than the configuration that the frame 26 is moved upward and downward by the drive wire 34 and thereby the relative height positions between the key tops 24 and the frame 26 are changed.

FIG. 14A is a motion diagram illustrating one example of a configuration which moves upward and downward the key top 24, that is, a side view illustrating one example that the key top 24 is at the highest use position. FIG. 14B is a motion diagram illustrating one example of the configuration which moves upward and downward the key top 24, that is, a side view illustrating one example that the key top 24 has been depressed from the state illustrated in FIG. 14A to a nonuse position.

As illustrated in FIGS. 14A and 14B, in this configuration, the drive wire 34 is installed along a rear side part of each key top 24. In this case, although a pressing piece 70 which projects forward on the side of each key top 24 and is allowed to press downward a receiving piece 24a by being arranged into abutment on an upper surface of the receiving piece 24a of each key top 24 is provided on an outer circumferential surface of the drive wire 34, the above-mentioned bent part 34d is not provided. The drive wires 34 are arranged side by side in the fore-and-aft direction by the number corresponding to the number of the key tops 24 which have been arrayed in the fore-and-aft direction. Incidentally, a reference numeral 72 in FIG. 14 is a guide mechanism having a pantograph structure which supports the key tops 24 to be movable upward and downward, and a reference numeral 74 is a water-proof sheet which is stuck to the lower surface side of the base plate 32 and fills a notch and so forth when the notch and so forth are formed in the bottom surface of the base plate 32.

The base part 34b of each drive wire 34 is positioned and supported to be rotatable by a bearing part (not illustrated) which has been provided on the base plate 32 or the frame 26 at an appropriate place in the left-and-right direction thereof. Thereby, when the left and right slide members 60 move in the fore-and-aft direction, the drive end parts 34a move in the fore-and-aft direction together with the slide members 60 while rotating in the slits 60a in the slide members 60. Consequently, the base part 34b rotates around an axis while the arm part 34c is swinging in the fore-and-aft direction like a pendulum with the base part 34b which has been pivoted by the bearing part being set as the center of rotation. The pressing piece 70 projects from the outer peripheral surface of the base part 34b toward the key top 24 side by being formed so as to be bent from an attachment cylinder 76 which has been fitted on and fixed to the outer circumferential surface of the base part 34b of each drive wire 34. The pressing piece 70 is a plate piece which has projected from an outer circumferential surface of the attachment cylinder 76 and a pressing part which has been slightly bent downward is provided on a leading end thereof.

Accordingly, since while the display chassis 14 is being moved from the 0-degree position to the 180-degree position, the slide member 60 is located at the initial position obtained by moving to the front-most side (see FIG. 10), the key top 24 is set to the use position where the key top 24 has jumped out above the frame 26 as illustrated in FIG. 14A. Thereby, use of the keyboard unit 20 becomes possible.

On the other hand, when the display chassis 14 is rotationally moved in the opening direction beyond the 180-degree position and the slide member 60 advances rearward (see FIG. 11), also the drive end part 34a of the drive wire 34 moves rearward as illustrated in FIG. 14b and therefore the drive wire 34 rotates in a direction that the pressing piece 70 moves downward. Consequently, the receiving piece 24a receives a pressing action by the pressing piece 70 and the key top 24 moves downward together with the pressing piece 70. Then, at the 360-degree position, the top surface of the key top 24 is flush with or is located slightly lower than the upper surface of the frame 26 and the upper surface of the keyboard unit 20 is flattened as illustrated in FIG. 14B. Consequently, since each key top 24 is brought into a state of being substantially hidden under the frame 26 and the front surface 16a of the body chassis 16 is flattened, the keyboard unit 20 does not hinder the operation when the electronic device 10 is used as the tablet type PC.

Then, since the drainage passage 36 is provided under the insertion ports 32b in the base plate 32 also in the structure that each key top 24 is moved upward and downward by the drive wise 34 in this way, it is possible to smoothly discharge the liquid which drops through each insertion port 32b to the outside of the body chassis 16.

As described above, the electronic device 10 according to the present embodiment is configured to couple together the body chassis 16 on the front surface 16a of which the keyboard unit 20 which has the keyboard body 30 that the plurality of key tops 24 is surrounded by the frame 26 and the base plate 32 which houses and supports the bottom surface of the keyboard body 30 has been provided, and the display chassis 14 which has the display 18 by the hinge mechanism 12 to be rotationally movable, and includes the link mechanism 50 provided in the body chassis 16 and configured to operate in linkage with the rotational moving operation for rotationally moving the display chassis 14 relative to the body chassis 16 by the hinge mechanism 12 and the drive wire 34 which is the drive member configured to couple between the link mechanism 50 and the keyboard unit 20 and operate in linkage with the link mechanism 50 thereby to change the relative height positions between the key top 24 and the frame 26. Then, the drive wire 34 is extended to the outside of the keyboard unit 20 through the insertion port 32b formed in the side wall 32a of the base plate 32 and is coupled with the link mechanism 50 and the body chassis 16 includes the drainage passage 36 at the position located under the insertion port 32b.

In the configuration as mentioned above, for example, when the user has spilled the liquid such as water, the beverage and so forth on the upper surface of the keyboard unit 20 in error, there are cases where the liquid flows onto the upper surface of the base plate 32 which houses and supports the keyboard body 30 through the gaps around each key top 24 and between the key tops 24 and flows down therefrom into the body chassis 16 through the insertion port 32*b* through which the drive wire 34 is to be inserted. However, since in the electronic device 10 concerned, the drainage passage 36 is provided at the position located under the insertion ports 32*b*, it is possible to smoothly discharge the liquid which has flown out through each insertion port 32*b* or has dropped along the drive wire 34 to the outside of the body chassis 16 and leaking of the liquid into the electronic components in the body chassis 16 such as the electronic components and so forth provided on the electronic substrate 38 is prevented.

In the electronic device 10 concerned, the body chassis 16 has the electronic substrate 38 between the keyboard unit 20 and the bottom surface cover 22, and the electronic substrate 38 has each hole part 38*a* at the position located under each insertion port 32*b*. Therefore, since the liquid which flows down through each insertion port 32*b* smoothly flows down into the drainage passage 36 through each hole port 38*a* without flowing on the upper surface of the electronic substrate 38, it is possible to prevent the liquid from leaking into the electronic components on the electronic substrate 38.

The link mechanism 50 has the slide member 60 which is provided with the slit 60*a* with which the drive end part 34*a* of the drive wire 34 which has been extended to the outside of the keyboard unit 20 through the insertion port 32*b* is engaged and rotates the drive wire 34 by moving in the fore-and-aft direction in association with the rotating operation of the hinge mechanism 12. Then, the slide member 60 is installed on the upper surface side of the electronic substrate 38 on the side part of the keyboard unit 20 and has the projection 60*b* which projects downward from the lower surface side of the slit 60*a* and has been inserted into the hole part 38*a* in the electronic substrate 38. Thereby, it is possible to drop the liquid which has flown into each slit 60*a* along the drive wire 34 passing through each insertion port 32*b* to the part under the hole part 38*a* along the projection 60*b* and to smoothly discharge the liquid to the drainage passage 36.

In the electronic device 10 concerned, the drainage passage 36 is configured to have the drainage port 64 which has been formed through the bottom surface cover 22 of the body chassis 16 and the tub-shaped part 66 which connects between the drainage port 64 and the position located under the insertion port 32*b* so as to allow flowing of the liquid. Therefore, it is possible to surely guide the liquid which has dropped through each insertion port 32*b* to the drainage port 64 by passing the liquid through the tub-shaped part 66.

In this case, the plurality of drive wires 34 is arranged in line along the fore-and-aft direction of the keyboard unit 20, and the plurality of insertion ports 32*b* is provided so as to correspond to the respective drive wires 34 respectively, the tub-shaped part 66 is provided throughout the position located under all of the insertion ports 32*b* and the downstream side thereof communicates with the drainage port 64. Thereby, it is possible to smoothly guide the liquid which has dropped through the plurality of insertion ports 32*b* to the drainage port 64 by using one tub-shaped part 66 and therefore it is possible to minimize the installation number of the drainage ports 64 to be formed in the bottom surface cover 22 of the body chassis 16.

In case of the electronic device 10 concerned, the base plate 32 has the bath-tub-shaped part which allows the base plate 32 to house the bottom surface of the keyboard body 30 and to store the liquid therein and forms the insertion ports 32*b* in the side walls 32*a* of the bath-tub-shaped part. Therefore, for example, the liquid which has been spilled on the upper surface of the keyboard unit 20 in error is smoothly discharged through the insertion ports 32*b* under which the drainage passage 36 has been provided while being stored in the bath-tub-shaped base plate 32. Thereby, since leaking of the liquid from the base plate 32 into the body chassis 16 is prevented at a portion where the drainage passage 36 is not provided, it is possible to more surely prevent the liquid from linking into the electronic components in the body chassis 16.

As has been described, the present invention provides an electronic device configured to couple between a body chassis having a keyboard unit and a display chassis having a display by a hinge mechanism.

While the invention has been particularly shown and described with reference to a preferred embodiment, it will be understood by those skilled in the art that various changes in form and detail may be made therein without departing from the spirit and scope of the invention.

What is claimed is:
1. An electronic device comprising:
   a body chassis includes a keyboard body having a plurality of key tops surrounded by a frame and a base plate that supports a bottom surface of said keyboard body, wherein said body chassis includes an electronic substrate located between said keyboard body and a bottom surface cover;
   a display chassis includes a display having a hinge mechanism;
   a link mechanism, provided in said body chassis, rotationally moves said display chassis relative to said body chassis by said hinge mechanism, wherein said link mechanism has a slide member in which a slit with which an end part of said drive member that has been extended to an outside of said keyboard body through said insertion port is engaged is provided, and rotates said drive member by moving in a fore-and-aft directions in association with a rotating operation of said hinge mechanism; and
   a drive member, couple between said link mechanism and said keyboard body, operates in linkage with said link mechanism to change relative height positions between said key tops and said frame, wherein said drive member is extended to the outside of said keyboard body through an insertion port formed in said base plate and is coupled with said link mechanism, and said body chassis includes a drainage passage at a position located under said insertion port.

2. The electronic device of claim 1, wherein said slide member has a projection installed on an upper surface side of said electronic substrate on a side part of said keyboard body, projects downward from an lower surface side of said slit and has been inserted into said opening of said electronic substrate.

3. The electronic device of claim 1, wherein a plurality of said drive members is arranged side by side along said fore-and-aft direction of said keyboard body, and a plurality of said insertion ports is provided so as to respectively correspond to said drive members.

* * * * *